United States Patent
Kellner et al.

(10) Patent No.: US 10,964,984 B2
(45) Date of Patent: Mar. 30, 2021

(54) BATTERY INSTALLATION FOR AN AT LEAST PARTIALLY ELECTRICALLY OPERATED MOTOR VEHICLE

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 163 days.

(21) Appl. No.: 16/160,314

(22) Filed: Oct. 15, 2018

(65) Prior Publication Data

US 2019/0148688 A1    May 16, 2019

(30) Foreign Application Priority Data

Nov. 16, 2017  (DE) .......................... 102017126949.5

(51) Int. Cl.
*H01M 2/10* (2006.01)
*H01M 50/20* (2021.01)

(52) U.S. Cl.
CPC ........ *H01M 50/20* (2021.01); *H01M 2220/20* (2013.01)

(58) Field of Classification Search
CPC ........... H01M 2220/20; H01M 2/1077; H01M 2/1094; H01M 2/10; H01M 2/1083; H01M 8/2475
See application file for complete search history.

(56) References Cited

U.S. PATENT DOCUMENTS

| | | | | |
|---|---|---|---|---|
| 6,227,322 B1 * | 5/2001 | Nishikawa | ........... | B62D 29/008 180/68.5 |
| 6,230,834 B1 * | 5/2001 | Van Hout | ............... | B60R 16/04 180/68.5 |
| 7,128,999 B1 * | 10/2006 | Martin | ................ | H01M 2/1077 429/99 |
| 9,929,389 B2 | 3/2018 | Klimek et al. | | |

(Continued)

FOREIGN PATENT DOCUMENTS

DE  102011119540 A1   5/2013
DE  102015111749 A1   1/2017

OTHER PUBLICATIONS

German Search Report for German Application No. 10 2017 126 940.5, with partial translation dated, Sep. 6, 2016—7 pages.

*Primary Examiner* — Imran Akram
(74) *Attorney, Agent, or Firm* — RatnerPrestia

(57) ABSTRACT

A battery installation for an at least partially electrically operated motor vehicle and to a motor vehicle having such a battery installation. The battery installation includes a receptacle installation for providing a receptacle space for at least one battery module having at least one battery cell. The receptacle installation includes an upper part-structure which delimits the receptacle space in an upward and/or a lateral manner, and a lower part-structure which delimits the receptacle space in a downward manner. The lower part-structure herein includes an upper component that is configured so as to be planar, and a lower component that is configured so as to be planar, and at least one reinforcement component that is disposed between the upper component and the lower component and is configured as a hollow profile.

20 Claims, 3 Drawing Sheets

(56) References Cited

U.S. PATENT DOCUMENTS

| | | | |
|---|---|---|---|
| 2005/0260488 A1* | 11/2005 | Zhou | H01M 2/1077 |
| | | | 429/99 |
| 2009/0186266 A1* | 7/2009 | Nishino | B60L 11/1879 |
| | | | 429/120 |
| 2011/0132676 A1* | 6/2011 | Kodaira | B62D 25/20 |
| | | | 180/65.51 |
| 2011/0143179 A1* | 6/2011 | Nakamori | H01M 2/1077 |
| | | | 429/99 |
| 2012/0103714 A1* | 5/2012 | Choi | B60L 3/0046 |
| | | | 180/68.5 |
| 2012/0156539 A1* | 6/2012 | Honjo | B60K 1/04 |
| | | | 429/100 |
| 2015/0249240 A1 | 9/2015 | Hihara et al. | |
| 2016/0023689 A1* | 1/2016 | Berger | B60L 58/26 |
| | | | 180/65.23 |
| 2017/0120951 A1* | 5/2017 | Ashraf | B62D 27/023 |
| 2017/0240207 A1* | 8/2017 | Kido | H01M 2/10 |
| 2018/0154754 A1* | 6/2018 | Rowley | H01M 10/6556 |
| 2018/0337374 A1* | 11/2018 | Matecki | H01M 10/656 |
| 2019/0100090 A1* | 4/2019 | Matecki | B60L 50/66 |

* cited by examiner

BATTERY INSTALLATION FOR AN AT LEAST PARTIALLY ELECTRICALLY OPERATED MOTOR VEHICLE

CROSS-REFERENCE TO RELATED APPLICATION

This application claims priority to German Patent Application No. DE 10 2017 126 949.5, filed Nov. 16, 2017, which is incorporated by reference herein in its entirety.

FIELD OF THE INVENTION

The present invention relates to a battery installation for an at least partially electrically operated motor vehicle and to a motor vehicle having such a battery installation. The battery installation comprises at least one receptacle installation for providing at least one receptacle space for at least one battery module having at least one battery cell.

BACKGROUND OF THE INVENTION

The batteries of electric vehicles or hybrid vehicles, respectively, often have battery cells which are assembled in groups to form battery modules. The battery modules typically are interconnected and accommodated in a receptacle installation often also referred to as a battery housing. The receptacle installation is often disposed in the floor region of the vehicle.

The constructive design embodiment of the receptacle installation herein typically has a particular significance. The battery modules are to be received in a reliable and operationally secure manner, on the one hand. This relates to the loads to be expected in the driving operation as well as in extraordinary events such as, for example, driving over objects or a crash. Moreover, a cost-effective assembly without complexity should also be possible. The receptacle installation should furthermore not unfavorably influence the weight of the battery.

SUMMARY OF THE INVENTION

Described herein is an improved receptacle installation of a battery installation for an at least partially electrically operated motor vehicle. The receptacle installation is preferably intended to meet the aforementioned requirements in a particularly advantageous manner.

The battery installation according to aspects of the invention is in particular configured as a high-voltage power accumulator. The battery installation is provided for an at least partially electrically operated motor vehicle. The battery installation comprises at least one receptacle installation for providing at least one receptacle space for at least one battery module having at least one battery cell. The receptacle installation comprises at least one upper part-structure which at least partially delimits the receptacle space at least in an upward and/or a lateral manner. The receptacle installation comprises at least one lower part-structure which at least partially delimits the receptacle space at least in a downward manner. The lower part-structure herein comprises at least one upper component that is configured so as to be substantially planar, and at least one lower component that is configured so as to be substantially planar. The lower part-structure comprises at least one reinforcement component that is disposed between the upper component and the lower component and is configured as a hollow profile.

The battery installation according to aspects of the invention offers many advantages. The assembly of the lower part-structure from multiple parts offers a significant advantage. The deformation behavior can thus be influenced in a targeted manner by way of the arrangement and the geometric embodiment of the components and preferably of the reinforcement component. On account thereof, a design, layout that is particularly suitable for meeting the requirements and for a lightweight construction is possible. Moreover, the battery installation according to aspects of the invention, on account of the assembly from multiple parts, can be produced or assembled, respectively, in a cost-effective manner without any particular complexity.

The receptacle space by way of the upper part-structure is in particular closed off at least in an upward and/or a lateral manner. In particular, the receptacle space by way of the lower part-structure is closed off at least in a downward manner.

The lower part-structure is preferably formed by the lower component and the upper component and the reinforcement component.

The upper component and the lower component at least in the peripheral regions thereof and preferably in the region of at least one of the lateral edges thereof are preferably at least in portions directly interconnected. The upper component and the lower component can also be interconnected in other regions, and, for example, at least in portions be interconnected along central regions. The upper component and the lower component in the peripheral regions thereof can at least in portions also be interconnected by way of the reinforcement component.

The reinforcement component is preferably at least in partially connected to the upper component and/or to the lower component. The upper component and the lower component are in particular at least in portions interconnected by way of the reinforcement component.

The lower part-structure is particularly preferably connected to the upper part-structure so as to be capable of being disassembled. Such a connection, capable of being disassembled, offers many advantages. It is particularly advantageous that the dimensional accuracy of the receptacle installation, or of the battery installation, respectively, is significantly improved on account thereof. For example, such a connection, capable of disassembly, offers significant advantages as compared to welding. Welding a base to a battery frame structure is typically very complex and often causes significant distortion by welding. The planarity of the base is significantly compromised on account thereof. Moreover, the accessibility of the battery installation is significantly improved by way of such a connection capable of disassembly, such that the assembly and maintenance are significantly simplified.

The lower part-structure is in particular connected to the upper part-structure so as to be releasable in a non-destructive manner. The lower part-structure can however also be fixedly connected to the upper part-structure. It is possible for the upper component and the lower component and the at least one reinforcement component to be capable of disassembly from the upper part-structure as one unit. It is also possible for the upper component and the lower component and the at least one reinforcement component to be at least, partially capable of being individually disassembled.

The lower part-structure is preferably connected to the upper part-structure by means of at least one screw connection and/or by means of at least one adhesive connection. Other types of connections are also possible. A combination of a screw connection and an adhesive connection and/or at least one further type of connection is particularly preferably provided. The adhesive connection is in particular suitable and configured for a non-destructive disassembly of the components. Such types of connections enable a connection that is capable of being assembled or disassembled, respectively, in a particularly reliable manner and at the same time without complexity.

The battery installation in a particularly advantageous design embodiment comprises at least one sealing installation for sealing, and in particular for sealing in a water-tight manner, the lower part-structure in relation to the upper part-structure. The sealing installation comprises in particular at least one seal and/or at least one tubular seal and/or at least one rubber seal, or the like. It is also preferable for the sealing installation to comprise at least one adhesive connection, for example in the form of at least one adhesive bead. The sealing installation serves in particular for sealing in relation to water and/or other media that arise in the operation of the battery installation. Such a sealing installation offers a significant saving in terms of complexity and costs in the assembly or production, respectively. Expensive and complex seal welds can be dispensed with on account thereof, for example.

It is preferable for the lower part-structure to be connected to the upper part-structure at least by means of at least one thick-film adhesive. The thick-film adhesive is used in particular in the form of at least one adhesive bead, or is configured as an adhesive bead, respectively. The thick-film adhesive is in particular suitable and configured for producing an adhesive connection and/or for providing a sealing installation for the lower part-structure in relation to the upper part-structure.

Both a connection between the lower part-structure and the upper part-structure as well as sealing of the lower part-structure in relation to the upper part-structure is performed in particular by the thick-film adhesive. This enables sealing and linking in one common operating step without complexity. A thick-film adhesive such as can used in a comparable manner also as a glass adhesive in the automotive industry is provided, for example.

It is preferable for the upper component and/or the lower component and/or the reinforcement component to be at least partially made from at least one light metal material and/or from at least one steel material and/or from at least one non-reinforced or particle-reinforced and/or fiber-reinforced plastics material. It is also possible and preferable for the upper component and/or the lower component and/or the reinforcement component to be made from a combination of at least two such materials. The light metal material is preferably composed of aluminum and/or magnesium and/or respective alloys thereof. Aluminum or an aluminum alloy is particularly preferably used. Such materials or combinations, respectively, can be used in a particularly advantageous manner for the battery installation according to aspects of the invention.

The upper component and the lower component are preferably connected by means of at least one adhesive connection and/or by means of at least one welded connection and/or by means of at least one mechanically connected joint. It is also preferable for the reinforcement component and the upper component and/or the lower component to be connected by means of at least one adhesive connection and/or by means of at least one welded connection and/or by means of at least one mechanically connected joint. The mechanically connected joint is configured as an embossing, for example. Such types of connections enable a particularly reliable or stable, respectively, assembly which at the same time is without complexity. Other suitable types of connections are also possible.

It is possible and preferable for the reinforcement component to be provided by at least one extruded profile and/or a profile that is produced in a continuous manufacturing process. The reinforcement component comprises in particular at least one such profile. A profile of this type has particularly advantageous constructive and mechanical properties. It is also possible for the profile to be produced by at least one other suitable method.

The reinforcement component is preferably at least partially produced by means of at least one extrusion method. The reinforcement component comprises in particular at least one extruded component and preferably an extruded profile, or is provided by at least one of the latter two. Such a reinforcement component is in particular composed of a light metal material and, for example, of aluminum or magnesium or an alloy thereof. Such reinforcement components can be used in a particularly advantageous manner for the receptacle installation.

The reinforcement component is preferably at least partially produced from at least one fiber-plastics material composite, in particular by means of braiding and/or pultrusion. Another suitable production method for a fiber-plastics material composite is also possible. It is also preferable for the reinforcement component to be at least partially produced from at least one non-reinforced or reinforced plastics material, in particular by means of extrusion. Another suitable production method for a non-reinforced or reinforced plastics material is also possible. A reinforcement component that is designed in such a manner offers particularly positive lightweight construction properties.

The upper part-structure comprises in particular at least one battery frame structure, or is configured as such. The lower part-structure comprises in particular at least one battery housing base, or is configured as such. The upper and/or lower part-structure can also provide or comprise other components.

It is possible for the upper part-structure to comprise at least one cover. The cover is preferably configured as a planar component. It is preferable for the at least one battery module to be fastened to the upper part-structure preferably to the battery frame structure.

It is also possible for the upper part-structure to at least partially be provided by a body structure of a host vehicle.

The battery frame structure can comprise at least one profile and in particular at least one hollow profile. The profiles are in particular connected in the manner of a framework. The battery frame structure comprises, for example, at least one longitudinal support and/or at least one transverse support. The battery frame structure comprises in particular at least one transverse stay and/or at least one longitudinal stay, either or both being connected to the longitudinal support or the transverse support, respectively.

It is possible for the at least one battery module to be at least partially fastened to the lower part-structure. The at least one battery module is preferably not fastened to the lower part-structure and in particular not to the battery housing base. The lower part-structure is in particular suitable and configured for serving as an impact protection when driving over objects. The lower and/or the upper component are/is in particular configured as a guard plate. However, it is, also possible for the lower part-structure to be assigned an additional guard plate. The at least one reinforcement component enables in particular a spacing of the lower component from the upper component that is suitable as an impact protection.

It is particularly preferable in all design embodiments for the lower part-structure to comprise at least two reinforcement components. This enables a particularly robust and stable design embodiment of the receptacle installation. The reinforcement components are in particular in each case configured as a hollow profile, it is also possible for a plurality of reinforcement components to be provided. For example, three or four or else five or eight reinforcement components can be provided. It is also possible for ten or more reinforcement components to be provided. A number of the reinforcement components is in particular adapted to a size of the battery installation.

The motor vehicle according to aspects of the invention is equipped with an at least partially electrically operated traction drive. In order for the traction drive to be provided with power, the motor vehicle comprises at least one battery installation as has been described above.

The motor vehicle according to aspects of the invention has many advantages and can, for example, be produced in a particularly economical manner without complexity. Said motor vehicle according to aspects of the invention is moreover particularly maintenance-friendly and offers an optimized overall weight. The motor vehicle is configured in particular as a passenger motor vehicle.

The upper component and/or the lower component are in particular configured so as to be planar. The lower component is in particular configured as a planar component. The upper component is in particular configured as a planar component. The upper component and/or the lower component can also comprise in each case one planar component. For example, a sheet-metal component or a plate component is provided. The upper component and/or the lower component can be configured so as to be flat or planar, respectively. It is also possible for the upper component and/or the lower component to be configured so as not to be flat. The upper component and/or the lower component can, for example, have an undulated shape or a trapezoidal shape, or any other geometric shape.

The hollow profile is in particular configured as a closed hollow profile. The hollow profile comprises at least one cavity. The hollow profile can, for example, also have two or three or more cavities. The hollow profile is in particular closed along the longitudinal edges thereof. It is possible for the hollow profile to have clearances and, for example bores, or the like.

It is possible for at least one reinforcement element in addition to the at least one reinforcement component to be disposed between the upper component and the lower component. The reinforcement element is in particular not configured as a hollow profile. The reinforcement element can be disposed separately from the reinforcement component. The reinforcement element can at least in portions also be disposed on the reinforcement component. It is possible for the reinforcement component and the reinforcement element in terms of the functions thereof to at least partially complement one another. It is also possible for the reinforcement element and the reinforcement component to fulfil independent functions.

The battery installation is in particular provided for installation in a floor region of a vehicle. The battery installation is in particular configured as an underfloor battery. The battery installation can also be provided for another position.

BRIEF DESCRIPTION OF THE DRAWINGS

Further advantages and features of the present invention are derived from the exemplary embodiment which will be explained hereunder with reference to the appended figures in which.

DETAILED DESCRIPTION OF THE INVENTION

Figure 1:
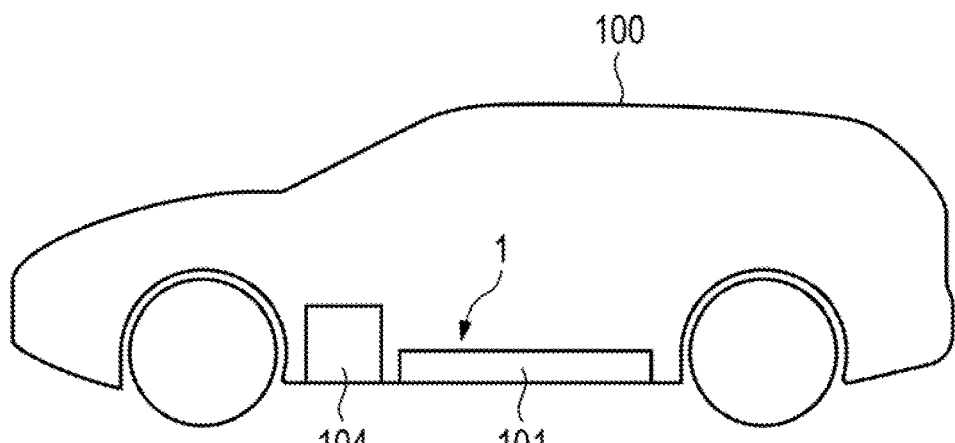
FIG. 1 shows a very schematic illustration of a battery installation according to aspects of the invention in a motor vehicle.

FIG. 1 shows a motor vehicle 100 which is configured as an electric vehicle. The vehicle 100 can also be configured as a hybrid vehicle. The motor vehicle 100 is equipped with a battery installation 1 according to aspects of the invention, which serves as a high-voltage power accumulator 101 for an electric traction drive 104. The battery installation 1 here in an exemplary manner is accommodated in a floor region of the motor vehicle 100. The battery installation 1 can however also be disposed in another location in the motor vehicle 100.

Figure 2:
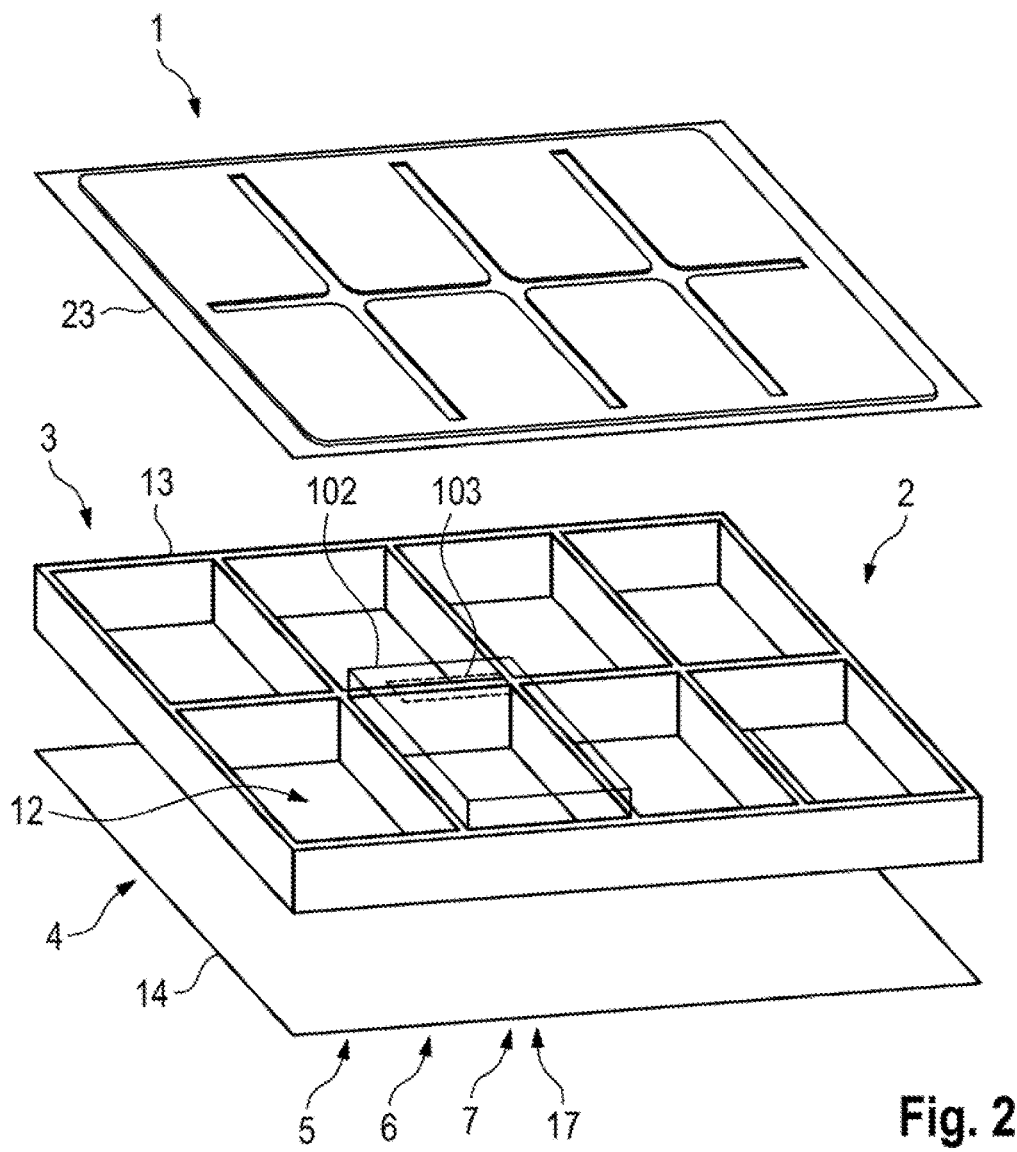
FIG. 2 shows a very schematic illustration of a battery installation in a perspective exploded illustration.

A battery installation 1 according to aspects of the invention is shown in a perspective view in an exploded illustration in FIG. 2. The battery Installation 1 comprises a plurality of battery modules 102 which in each case have a plurality of battery cells 103. For reasons of improved clarity, only one module 102 having one cell 103 is drawn here in an exemplary manner.

The battery modules 102 are disposed in a receptacle installation 2 which makes available a receptacle space 12 for the modules 102. The receptacle space 12 is subdivided, for example, into a plurality of portions for in each case one module 102, or else for a group of modules 102.

The receptacle installation 2 comprises an upper part-structure 3 and a lower part-structure 4. The upper part-structure 3 here has a battery frame structure 13 which laterally delimits and closes off the receptacle space 12. The upper part-structure 3 in one design embodiment can have a cover 23 which delimits and closes off the receptacle space 12 in an upward manner.

The battery frame structure 13 comprises, for example, transverse webs and longitudinal supports which are interconnected in the manner of a framework. The individual battery modules 102 can be received between the transverse webs and longitudinal supports. The transverse webs and/or longitudinal supports are configured, for example, as profiles and in particular as hollow profiles. The transverse webs and/or longitudinal supports can also be provided by other suitable construction components.

The lower part-structure 4 here is configured as a battery housing base 14 which delimits and closes off the receptacle space 12 in a downward manner.

The lower part-structure 4 here comprises an upper component 5 that is configured so as to be planar, and a lower component 6 that is configured so as to be planar, and at least one reinforcement component 7 that is disposed therebetween and is configured as a hollow profile 17. The components 5, 5, 7, 17 here are not illustrated individually and will be described in more detail with reference to the following figures.

Figure 3:
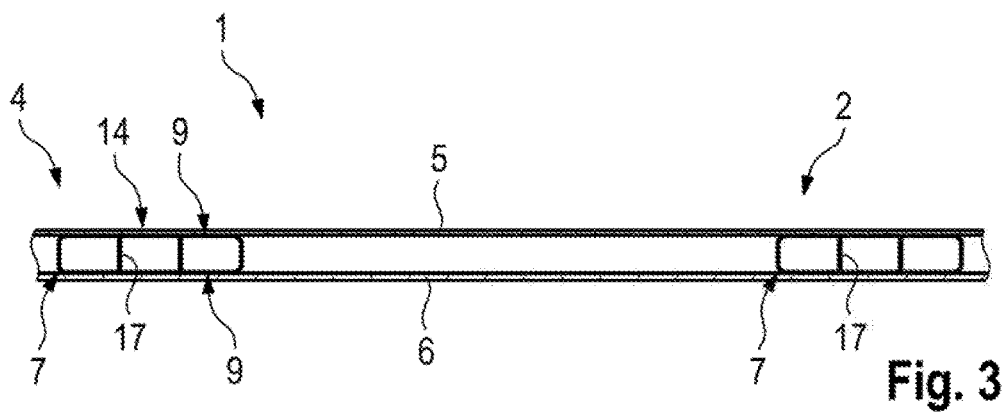
FIG. 3 shows a very schematic detailed illustration of a battery installation in a sectional lateral view.

A design embodiment of the lower part-structure 4 is illustrated in more detail in FIG. 3. The upper and the lower component 5, 6 here are in each case formed by one planar component and, for example, a plate.

Figure 5:
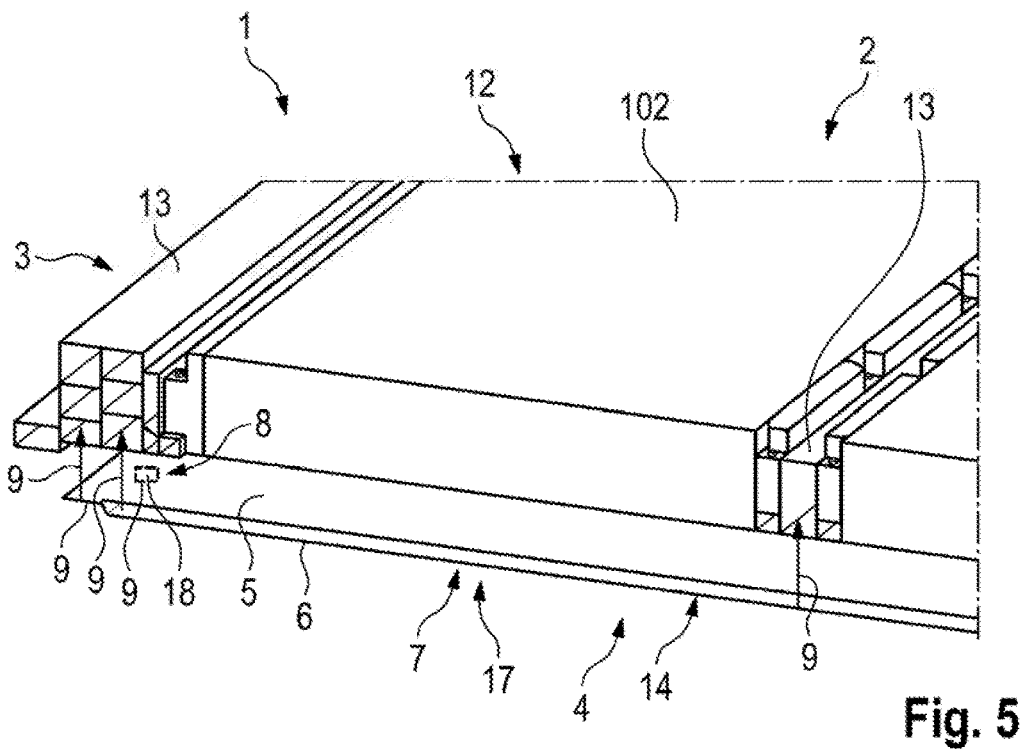
FIG. 5 shows a very schematic detailed illustration of a battery installation in a sectional perspective view from obliquely above.

The components 5, 6 at the peripheral regions thereof (not illustrated here) can be interconnected directly or else indirectly. The connection can, for example, be performed by means of at least one adhesive connection and/or by means of at least one welded connection and/or by means of at least one mechanically connected joint. For example, a direct connection of the components 5, 6 in the peripheral regions thereof is shown in FIG. 5.

The lower part-structure 4 moreover comprises two reinforcement components 7 which here are configured as hollow profiles 17. More or fewer reinforcement components 7 can also be provided in other design embodiments. The hollow profiles 17 here are configured so as to be closed and have in each case three cavities. More or fewer cavities are also possible. Hollow profiles 17 having another profile structure, or having another profile cross section, respectively, can also be provided.

The reinforcement components 7 here are connected to the upper component 5 and to the lower component 6. A connection 9 between the upper component 5 and the reinforcement element 7, and a connection 9 between the lower component 6 and the reinforcement component 7, here are performed, for example, by means of at least one adhesive connection and/or by means of at least one welded connection and/or by means of at least one mechanically connected joint.

Figure 4:
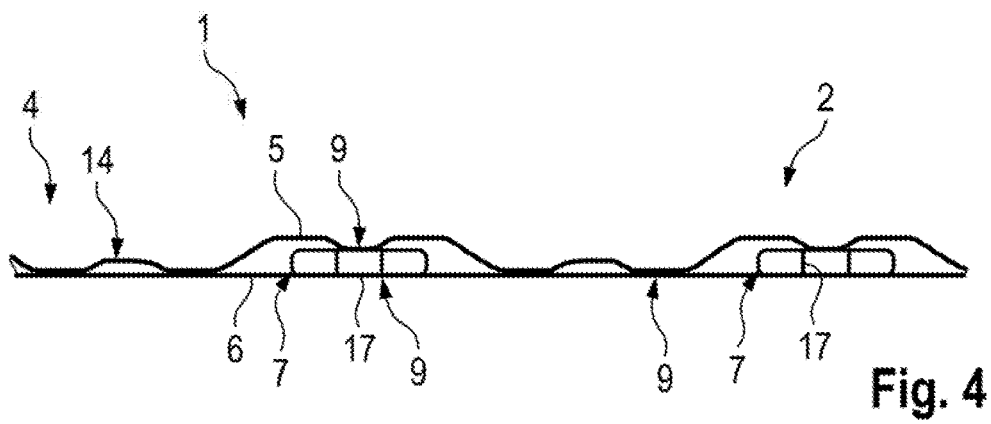
FIG. 4 shows a very schematic detailed illustration of a further battery installation in a sectional lateral view.

A further design embodiment of the lower part-structure 4 is shown in FIG. 4. The lower component 6 here is configured as a flat planar component.

The upper component 5 here is configured as an undulated or trapezoidal, respectively, planar component. Various undulating shapes or trapezoidal structures, respectively, are provided herein. A variable spacing of the upper component 5 from the lower component 6 is achieved on account thereof. Depending on the spacing, various components and, for example, the reinforcement components 7, can thus be accommodated. However, it is also possible for cavities without components to be provided between the components 5, 6.

The upper component 5 and the lower component 6 here are in portions directly interconnected. An adhesive connection and/or a welded connection and/or a mechanically connected joint are/is preferred as a connection 9. Additionally or alternatively, the components 5, 6 in the peripheral regions thereof at least in portions can also be interconnected. A connection in the peripheral regions is performed, for example, as is described with reference to FIG. 3.

The lower pan-structure here comprises to reinforcement elements 7 that are configured as hollow profiles 17. A connection 9 between the upper component 5 and the reinforcement component 7, or between the lower component 6 and the reinforcement component 7, respectively, is performed, for example, as is described with reference to FIG. 3.

FIG. 5 shows a battery installation 1 according to aspects of the invention, which in the fundamental construction thereof corresponds, for example, to the battery installation 1 described with reference to FIG. 2. The battery frame structure 13 of the upper part-structure 3 can be particularly readily seen here, said battery frame structure 13 here comprising various types of hollow profiles, for example. Moreover, the attachment of the battery modules 102 that are disposed in the receptacle space 12 to the battery frame structure 13 can be particularly readily seen here. The modules 102 here are not assembled on the battery housing base 14 such that the latter does not have to carry the weight of the modules 102.

The lower part-structure 4 here is configured as has been described above, for example. The at least one reinforcement component 7 that is configured as a hollow profile 17 herein is disposed so as to be obscured in the illustration shown.

The attachment of the lower part-structure 4 to the upper part-structure 3 is performed by means of connections 9 which here are indicated very schematically by arrows. The attachment is preferably also performed by way of further connections 9 (not illustrated here).

The lower part-structure 4 herein is attached to the upper part-structure 3 in particular in such a manner that a non-destructive disassembly is possible. To this end, the connections 9 between the upper and the lower part-structure 3, 4 are configured, for example, as a screw connection and/or an adhesive connection, or at least comprise one of the latter. The adhesive connection herein is in particular releasable without destroying the part-structures 3, 4.

The battery installation 1 can be equipped with at least one sealing installation 8 for sealing the lower part-structure 4 in a water-tight manner relation to the upper part-structure 3. The sealing installation 8 comprises, for example, a thick-film adhesive 18 which is applied in particular in the form of one or a plurality of adhesive beads. Besides the seal, an adhesive connection capable of disassembly between the part-structures 3, 4 is preferably performed by the sealing installation 8.

Figure 6:
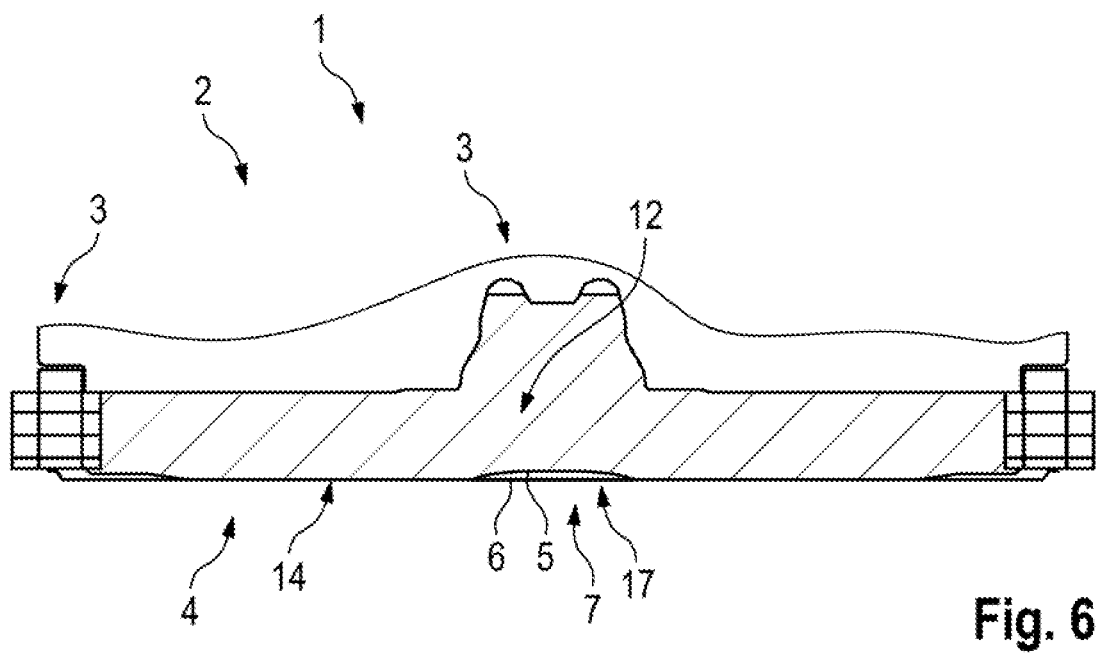
FIG. 6 shows a very schematic illustration of a battery installation in a sectional lateral view.

FIG. 6 shows a design embodiment of the battery installation 1 in which the upper part-structure 3 is configured as a component part of the body of a motor vehicle 100. The lower part-structure 4 is configured as has been described above, for example. The at least one reinforcement component 7 is not visible in the section plane shown here.

In the case of the design embodiments described here, the upper component 5 and/or the lower component 6 and/or the reinforcement component 7 are made, for example, from a light metal material and/or a steel material and/or from at least one non-reinforced or particle-reinforced and/or fiber-reinforced plastics material, or a combination of at least two such materials. Aluminum and/or magnesium and/or one of the respective alloys thereof are/is preferably provided as the light metal material.

The reinforcement components 7 shown here are, for example, extruded profiles and/or profiles produced in a continuous manufacturing process. The reinforcement components 7 can also be extruded profiles. The reinforcement components proposed here can at least partially also be produced from a fiber-plastics material composite by means of braiding and/or pultrusion. The reinforcement components 7 can at least partially also be produced from at least one non-reinforced or reinforced plastics material by means of extrusion. Other materials, or other production methods, respectively, are also possible.

The invention proposed here offers a particularly advantageous assembly of a receptacle installation 2 of a battery installation 1 in multiple parts. The deformation behavior in the event of a crash or extraordinary loads, respectively, can thus be influenced in a targeted manner by means of a local connection and, for example, an embossing, or a targeted spacing, respectively, of the planar components 5, 6, and of the coupling thereof to the reinforcement components 7 in a structural/mechanical manner. A layout concept that meets the requirements and is suitable for a lightweight construction, respectively, is thus possible. Moreover, a connection of the battery housing base 14 to the battery frame structure 13 that is capable of disassembly is moreover provided, on account of which the dimensional accuracy can be significantly improved.

The invention proposed here, on account the spacing between the battery modules 102 and the battery housing base 14, or the lower component 6, respectively, offers a significantly improved impact protection when driving over objects. Moreover, a significant saving in terms of cost is achieved by omitting expensive seal welds. Furthermore, a significant improvement of the planarity and of tolerances is achieved on account of the reduced thermal input, or on account of dispensing with problematic welded connections.

The invention moreover offers a significant improvement of the repair capability. A replacement of the battery housing base 14 without complexity, or a particularly simple access to the battery control system/battery cooling system/power electronics system, is possible without disassembling the entire receptacle installation 2, or the battery box, respectively.

The inventions also offers a significant weight reduction since the battery housing base 14, or the lower or upper component 5, 6 no longer have to support the weight of the battery modules 102.

The invention furthermore offers a significantly simplified production of the battery installation 1. The access to the battery modules 102 during the assembly is thus significantly simplified. Likewise, the access to a cooling system and to any cabling/bus bars and other battery components is possible in a particularly simple manner from both sides, or from above and below, respectively. The production is moreover simplified in that no separate guard plate is necessary in addition to the battery housing base 14. On account thereof, a saving in terms of, for example, numerous screws can be achieved. The handling in production is moreover improved.

LIST OF REFERENCE SIGNS

1 Battery installation
2 Receptacle installation
3 Part-structure
4 Part-structure
5 Component
6 Component
7 Reinforcement component
8 Sealing installation
9 Connection
12 Receptacle space
13 Battery frame structure
14 Battery housing base
17 Hollow profile
18 Thick-film adhesive
23 Cover
100 Motor vehicle
101 High-voltage power accumulator
102 Battery module
103 Battery cell
104 Traction drive

What is claimed is:

1. A battery installation for an at least partially electrically operated motor vehicle, comprising:
   at least one receptacle installation defining at least one receptacle space for receiving at least one battery module having at least one battery cell, wherein the receptacle installation comprises at least one upper part-structure which at least partially delimits the receptacle space at least in an upward or lateral manner, wherein the upper part structure comprises dividers that subdivide the receptacle space into a plurality of compartments that are each sized for receiving one of the battery modules, and wherein the receptacle installation comprises at least one lower part-structure which at least partially delimits the receptacle space at least in a downward manner,
   wherein the lower part-structure comprises (a) at least one upper component having an undulating surface defining adjacent undulations that are spaced apart for accommodating one of the dividers of the upper part structure between the adjacent undulations, (b) at least one lower component that is substantially planar, and (c) at least one hollow reinforcement component that is disposed (i) in an at least partially enclosed space defined by and between a lower surface of the upper component and an upper surface of the lower component and (ii) directly beneath the receptacle space, for impact protection at a lower side of the battery installation.

2. The battery installation as claimed in claim 1, wherein peripheral regions of the upper component and the lower component are directly interconnected.

3. The battery installation as claimed in claim 1, wherein the hollow reinforcement component is at least partially connected to the upper component or to the lower component.

4. The battery installation as claimed in claim 1, wherein the lower part-structure is releasably assembled to the upper part-structure.

5. The battery installation as claimed in claim 1, wherein the lower part-structure is connected to the upper part-structure by at least one screw connection or at least one adhesive connection.

6. The battery installation as claimed in claim 1, comprising at least one sealing installation for sealing the lower part-structure in a water-tight manner to the upper part-structure.

7. The battery installation as claimed in claim 1, wherein the lower part-structure is connected to the upper part-structure by at least one thick-film adhesive.

8. The battery installation as claimed in claim 7, wherein at least one thick-film adhesive is an adhesive bead.

9. The battery installation as claimed in claim 1, wherein one or more of the upper component, the lower component, and the reinforcement component is/are at least partially composed of at least one metal material or from at least one steel material or from at least one nonreinforced or particle-reinforced or fiber-reinforced plastics material or a combination thereof, and wherein the metal material is composed of aluminum, an aluminum alloy, magnesium or a magnesium alloy.

10. The battery installation as claimed in claim 1, wherein two or more of the upper component, the lower component, and the reinforcement component are connected by at least one adhesive connection or by at least one welded connection or by at least one mechanically connected joint.

11. The battery installation as claimed in claim 1, wherein the hollow reinforcement component comprises at least one extruded profile or a profile that is produced in a continuous manufacturing process.

12. The battery installation as claimed in claim 1, wherein the reinforcement component is at least partially produced by at least one extrusion method.

13. The battery installation as claimed in claim 1, wherein the hollow reinforcement component is at least partially produced from either (i) at least one fiber-plastics material composite by braiding or pultrusion, or (ii) extrusion from at least one non-reinforced or reinforced plastics material.

14. The battery installation as claimed in claim 1, wherein the upper part-structure provides at least one battery frame structure, or wherein the lower part-structure provides at least one battery housing base.

15. The battery installation as claimed in claim 1, wherein the lower part-structure comprises at least two hollow reinforcement components.

16. A motor vehicle having an at least partially electrically operated traction drive, comprising the battery installation as claimed in claim 1, for providing the traction drive with power.

17. The battery installation as claimed in claim 1, wherein the battery installation is a high-voltage power accumulator.

18. The battery installation as claimed in claim 1 further comprising a cover that is mounted above the upper-part structure, wherein the cover delimits and closes off the receptacle space in an upward manner.

19. The battery installation as claimed in claim 18, wherein the upper-part structure is sandwiched between the cover and the lower-part structure.

20. The battery installation as claimed in claim 1, wherein the at least one upper component of the lower part-structure is positioned between the at least one hollow reinforcement component and the upper-part structure.

\* \* \* \* \*